(12) United States Patent
Laurent et al.

(10) Patent No.: US 8,596,435 B2
(45) Date of Patent: Dec. 3, 2013

(54) MEDIUM FOR AN ELECTRIC CURRENT COLLECTION STRIP

(75) Inventors: Thierry Laurent, Amiens (FR); Guillaume Fardel, Amiens (FR)

(73) Assignee: Mersen France Amiens SAS, Amiens (FR)

( * ) Notice: Subject to any disclaimer, the term of this patent is extended or adjusted under 35 U.S.C. 154(b) by 170 days.

(21) Appl. No.: 13/140,981

(22) PCT Filed: Dec. 18, 2009

(86) PCT No.: PCT/FR2009/052624
§ 371 (c)(1),
(2), (4) Date: Jun. 20, 2011

(87) PCT Pub. No.: WO2010/070246
PCT Pub. Date: Jun. 24, 2010

(65) Prior Publication Data
US 2011/0315497 A1  Dec. 29, 2011

(30) Foreign Application Priority Data
Dec. 19, 2008  (FR) ...................................... 08 58846

(51) Int. Cl.
*B60L 5/38* (2006.01)
(52) U.S. Cl.
USPC .............................. 191/49; 191/55; 191/59.1
(58) Field of Classification Search
USPC .................. 191/49, 50, 59, 59.1, 60, 60.1
See application file for complete search history.

(56) References Cited

U.S. PATENT DOCUMENTS

| | | | | | |
|---|---|---|---|---|---|
| 2,221,611 | A | * | 11/1940 | Schaake | 191/55 |
| 2,229,810 | A | * | 1/1941 | Leuchs | 191/55 |
| 2,388,123 | A | * | 10/1945 | Conradty | 188/251 R |
| 2,761,025 | A | * | 8/1956 | Fisher | 191/59.1 |
| 4,300,666 | A | * | 11/1981 | Taniguchi et al. | 191/23 A |
| 5,152,380 | A | * | 10/1992 | Hoffmann et al. | 191/49 |
| 5,176,230 | A | * | 1/1993 | Odot | 191/87 |
| 5,193,656 | A | * | 3/1993 | Hoffmann et al. | 191/49 |
| 5,263,562 | A | * | 11/1993 | Hoffmann et al. | 191/45 R |
| 5,351,794 | A | * | 10/1994 | Deutzer | 191/55 |
| 5,878,854 | A | * | 3/1999 | Siessl et al. | 191/59.1 |
| 6,009,987 | A | * | 1/2000 | Siessl et al. | 191/59.1 |
| 6,105,741 | A | * | 8/2000 | Ross | 191/23 A |
| 7,870,938 | B2 | * | 1/2011 | Okimoto et al. | 191/59.1 |
| 2011/0315497 | A1 | * | 12/2011 | Laurent et al. | 191/49 |

FOREIGN PATENT DOCUMENTS

| | | |
|---|---|---|
| AT | 209376 | 6/1960 |
| DE | 466 423 | 10/1928 |
| JP | 62-293904 | 12/1987 |
| WO | WO 89/12560 | 12/1989 |

OTHER PUBLICATIONS

International Search Report dated Sep. 30, 2010 issued in PCT/FR2009/052624.

* cited by examiner

*Primary Examiner* — Jason C Smith
(74) *Attorney, Agent, or Firm* — Scully, Scott, Murphy & Presser, P.C.

(57) ABSTRACT

A medium for a rolling stock electric current collection strip is provided. The medium is suitable for holding said strip and transmitting the current passing through the strip to the rolling stock. The medium includes a base and at least two walls forming a space suitable for at least partially accommodating the strip. The medium includes at least one elastic means suitable for clamping the strip against the base.

19 Claims, 2 Drawing Sheets

MEDIUM FOR AN ELECTRIC CURRENT COLLECTION STRIP

BACKGROUND

The invention relates to a support for a current collector strip and more particularly a collector strip for a rolling stock vehicle.

The invention is equally suitable for a current collector strip of a pantograph rubbing on a catenary or that of a shoe rubbing on a rail.

At the present time, in order for a rolling stock vehicle to be supplied by an external current source, one of the techniques is to use a third rail, generally used in railway transport vehicles, such as subway vehicles, district trains, etc.

This third rail allows the current to be transmitted to the rolling stock vehicle by means of sliding shoes that collect the current and transfer it to the vehicle.

These shoes are made up in particular of a support, also called a yoke, onto which a collector strip, generally a carbon collector strip, is crimped.

To hold the collector strip in place on the yoke, the carbon strip is machined so as to provide a dovetail assembly with the edges of the yoke.

The support comprises a device for fastening to the rolling stock vehicle, generally a set of bolts.

The shoe thus assembled is then dipped into a bath of molten tin to braze the carbon strip to the yoke so as to ensure that there is good conductivity between the collector strip and the support.

It is the shoe thus assembled which is mounted on the rolling stock vehicle.

The carbon collector strip, sliding on the third rail in order to collect the current, is continuously worn away and requires to be changed regularly. Since the collector strip is irremovably fastened to the yoke, it is necessary to change the entire shoe, yoke and collector strip assembly, especially by dismantling all the bolts connecting it to the vehicle.

Since the collector strip is inseparable from the support, it is necessary to strip down the assembly, which represents a relatively high cost.

The operation of fitting/dismantling the shoe on the rolling stock vehicle is relatively lengthy since it requires the bolts joining the shoe to the vehicle to be fastened/unfastened.

The known devices may therefore be relatively expensive, lead to a "loss" of material, especially if the support is changed with each new collector strip, may require a long time for changes or maintenance, and many dismantling steps, and/or may not be sufficiently resistant, especially corrosion-resistant.

SUMMARY

The object of the invention is to remedy all or some of the abovementioned problems and in particular to provide a support for a collector strip that enables the said strip to be easily assembled on the rolling stock vehicle, while being able to be reused.

According to a first aspect, one subject of the invention is a support for a current collector strip of a rolling stock vehicle, said support being suitable for holding said strip in place and for transmitting the current passing through it to the rolling stock vehicle, said support comprising a base and at least two walls defining a space suitable for partially accommodating the strip, said support comprising at least one elastic means suitable for clamping said strip against said base.

More particularly, the strip is clamped against the base solely by the one or more elastic means, that is to say, in particular, no other means cooperates therewith for effecting the clamping operation.

The expression "electric rolling stock vehicle" is understood in the context of the present invention to mean any rolling stock vehicle requiring contact with a third rail shoe formed by the support and the collector strip.

By clamping the strip to the support it is possible to hold the assembly in place and thus ensure not only good mechanical stability but also good electrical conductivity.

In particular, the clamping is effected by a force ranging from 600 to 5000 N, especially 1000 to 1600 N.

Advantageously, the walls and/or the at least one elastic means are made of and/or coated with an electrically insulating material.

The coating may have a thickness ranging from 0.1 to 2 mm, especially from 0.1 to 1 mm and in particular from 0.1 to 0.5 mm.

In particular, the electrically insulating material is a plastic, a rubber, a resin and/or a paint.

In particular, the base comprises at least one stud suitable for cooperating with at least one corresponding orifice of the collector strip.

The base may comprise at least one lateral stop.

According to one particular embodiment, the base comprises two lateral stops.

Advantageously, at least one wall comprises at least one part, for example a notch, capable of accommodating a suitable, or complementary, part of the collector strip.

Advantageously, each notch is suitable for accommodating at least one elastic means.

In particular, the elastic means is a leaf spring.

Advantageously, the leaf spring is made of a plastic.

Since a current flows through the support, this current may cause, at least in certain parts, the conducting materials to heat up and thus reduce their mechanical properties.

By using an electrically insulating material as elastic means, or as a coating for the elastic means, it is possible for said elastic means not to be heated, or to be heated less, due to the flow of the current and therefore it is possible to maintain the desired mechanical properties, especially flexibility properties, for a longer time.

According to one particular embodiment, each notch is suitable for accommodating at least one locking means for locking the collector strip.

Advantageously, the locking means is a rod suitable for penetrating a corresponding orifice of the collector strip.

In particular, the elastic means is at least partly located at the junction between the bottom and the walls.

According to a first embodiment, the bottom and the walls are formed from a single piece, the elastic means providing from a mechanical property at the junction between the base and the walls.

According to a second embodiment, the base and the walls are separate pieces, these being connected by an intermediate piece forming a elastic connection.

According to one particular embodiment, the free ends of the walls each comprise an edge, notably arranged to allow moving apart the free ends of the walls.

The collector strip is most particularly a carbon-based strip.

The invention also relates to a current-collecting device comprising a support according to the invention and a collector strip held in place by the latter. This device may be a shoe or a pantograph.

Advantageously, the current-collecting device comprises an adhesive means between the collector strip and the support.

Notably, this adhesive means is suitable for securing the collector strip in the event of dislocation.

A dislocation may occur after a shock and more particularly after wear of the collector strip due to its rubbing, which reduces its thickness and therefore its mechanical strength. Dislocation of the strip may lead to the loss of fragments that run the risk of impairing the proper operation of the electric vehicle.

In particular, the adhesive means is positioned so as to form a contact between the base and the strip.

Advantageously, the adhesive means comprises a single-sided adhesive tape positioned so as to be in contact with just the strip.

In particular, the adhesive means is suitable for withstanding a temperature of between 100 and 500° C., preferably at least 150° C.

The adhesion of the collector strip to the support will preferably be effected at ambient temperature and will advantageously be of low enough force to allow easy dismantling and cleaning during an operation to change the strip.

According to a first embodiment, the adhesive means will for example be an adhesive tape bonded to the collector strip. In particular, the adhesive tape may be chosen from one or more of the following compounds: elastomer, cyanoacrylates, polyvinyl acetate and urea-formaldehyde. More particularly, the adhesive tape may be reinforced with textile or metal fibers. Advantageously, such a metal-based reinforcement helps to improve the electrical conductivity between the carbon strip and the support. The adhesive tape makes it possible in particular to increase the damping capability between the base of the support and the current collector strip.

According to another embodiment, the adhesive means is a one-component or two-component liquid adhesive. Advantageously, the adhesive is injected after the strip has been mounted on its support. In particular, the adhesive is chosen from the following elements: two-component epoxy based on bisphenol A, silicone, two-component polyurethane, or acrylic. In particular, it is possible to add an additive to the adhesive in order to facilitate the electrical conductivity, such as graphite or silver powder.

A person skilled in the art will be capable of determining which adhesive means is suited to his use. In particular, an adhesive tape will advantageously be used for the purpose of immediately reusing the support with a uniform force of adhesion and good damping capability. A liquid adhesive will require a longer time to mount the strip, but it does provide an adhesive means having better conductivity (addition of an additive).

Advantageously, an adhesive tape, bonded solely to the collector strip, will leave no adhesive on the support and therefore will not require a cleaning phase, thus making immediate reuse of the support easier.

More particularly, the adhesive means must have a lifetime in use, once assembled with the collector strip, of at least 6 to 7 months, or of at least 80,000 km, in operation.

The invention also relates to a method for fastening a collector strip to a support, the method comprising the following steps:
    moving apart the ends of the walls of the support, by means of the edges, sufficiently to be able to insert the collector strip thereinto;
    positioning the collector strip in the space defined between the base and the walls of the support; and
    releasing the ends of the walls of the support so as to clamp the strip against said base.

In particular, the method may comprise, before the collector strip is positioned in the space, the positioning of an adhesive tape on that part of the strip which is in contact with the base.

According to another way of implementing the fastening method, it is possible to add, after the ends of the walls have been released, a step of injecting an adhesive into the natural gaps or artificial gaps created between the strip and the support.

Depending on the nature of the adhesive means, pressure may be applied and the assembly placed in an oven.

The term "artificial gap" will be understood to mean that orifices may be provided in the support for injecting the adhesive.

In order for the adhesive to propagate easily, it is possible to provide grooves on that face of the strip which is in contact with the base of the support.

The invention also relates to a method for extracting a collector strip from a support, the method comprising the following steps:
    moving apart the ends of the walls of the support, by means of the edges sufficiently to be able to extract the collector strip therefrom;
    extracting the collector strip from the space defined between the base and the walls of the support: and
    releasing the ends of the walls of the support.

When an adhesive means is used, one may break the collector strip before it is extracted, the support then being able to be reused after removal of the adhesive means and cleaning.

In one particular application, the support is used as current-collecting shoe for a railway or pneumatic rolling stock vehicle.

BRIEF DESCRIPTION OF THE DRAWINGS

The invention will now be described with reference to the nonlimiting drawings in which.

DETAILED DESCRIPTION OF EXEMPLARY EMBODIMENTS

Figure 1:
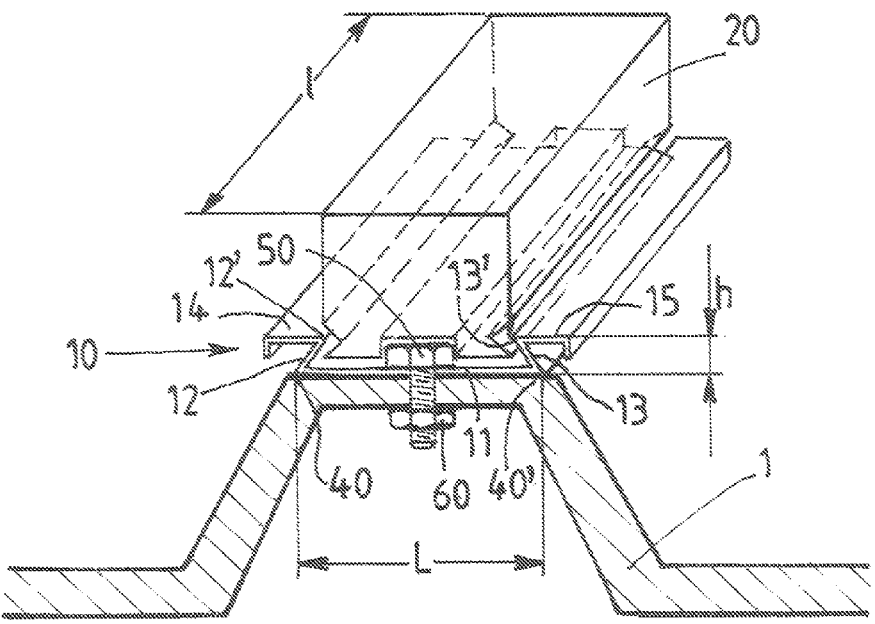
FIG. 1 is a view of a first embodiment of the invention.

FIG. 1 shows a first embodiment of a support 10.

According to the first embodiment shown in FIG. 1, this comprises a support 10 for a current collector strip 20.

The support 10 comprises a base and two walls 12, 13 defining a space suitable for partially accommodating the strip 20.

The collector strip 20 is machined so as to have a shoulder advantageously forming a dovetail profile.

The walls 12, 13 of the support make an acute angle with the base 11 so that the walls 12, 13 are suitable for cooperating with the dovetail profile of the collector strip 20. According to one particular embodiment, the walls 12, 13 of the support 10 form a fillet with the base 11.

In this example, the base 11 and the walls 12, 13 are formed from a single piece, the junction between the base 11 and the walls 12, 13 being elastic, thus moving the free ends 12', 13' closer one to the other.

The elasticity of the junction is a mechanical property that depends on the material used and on the dimensions of the support 10.

In the example, the support 10 is made of steel or stainless steel.

Its dimensions may be substantially the following:
- a width ranging from 35 to 70 mm, being 65 mm in the example;
- a length ranging from 200 to 300 mm, being 272 mm in the example,
- a height ranging from 30 to 60 mm, being 31 mm in the example; and
- a thickness ranging from 0.5 to 1.5 mm, being 0.8 mm in the example.

It is obvious that a person skilled in the art will adapt the dimensions of the support 10 so as always to maintain sufficient elasticity of the junctions 40, 40' so as to allow the strip 20 to be clamped against the bottom 11 via the walls 12, 13 bearing on the dovetail profile of said strip 20.

In the example, the overall force exerted by the elatic means is substantially around 1200 N.

According to an alternative embodiment, the base 11 and the walls 12, 13 are different elements, these being joined together by an element forming a elastic junction 40, 40'.

The walls 12, 13 each terminate in an edge 14, 15 suitable for withstanding a force able to move the free ends 12', 13' apart.

In particular, each edge 14, 15 is suitable for cooperating with a tool that exerts a force sufficient to move said ends apart.

The amount by which the ends 12', 13' are moved apart must be sufficient to enable the collector strip 20 to be inserted/removed.

To fasten the support 10 to a rolling vehicle 1, the support 10 is drilled right through so as to accommodate a fastening device, especially a device consisting of a bolt 50 and a nut 60.

Figure 2:
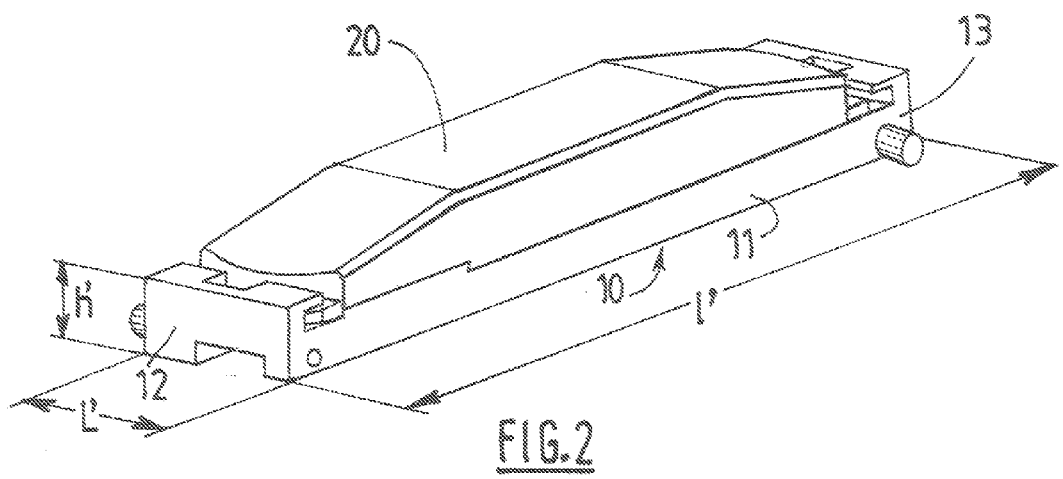
FIGS. 2 and 3 show a second embodiment of the invention.
Figure 3:
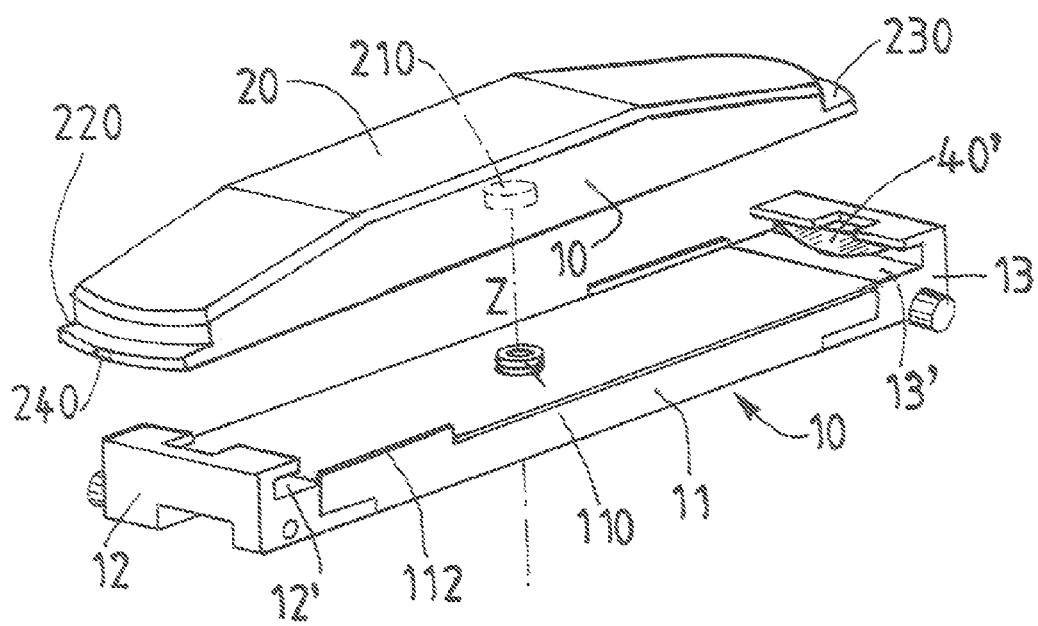

The second embodiment shown in FIGS. 2 and 3 comprises a support 10 for a current collector strip 20.

The base 11 comprises a stud 110 suitable for cooperating with a corresponding orifice 210 of the collector strip 20.

The base 11 also comprises two lateral stops 112, 112' suitable for blocking the collector strip 20.

The walls 12, 13 each comprise a notch 12', 13' suitable for accommodating a part 220, 230 of the collector strip 20.

To position the collector strip 20 on the support 20, said strip 20 is placed substantially at 90° to the support 10 while positioning the orifice 210 of the strip 20 on the stud 110 of the base 10.

Next, the strip 20 is then rotated through one quarter of a turn until it abuts against the lateral stops 112, 112'.

The parts 220, 230 of the strip 20 are then inserted into the notches 12', 13' of the walls 12, 13.

Figure 4:
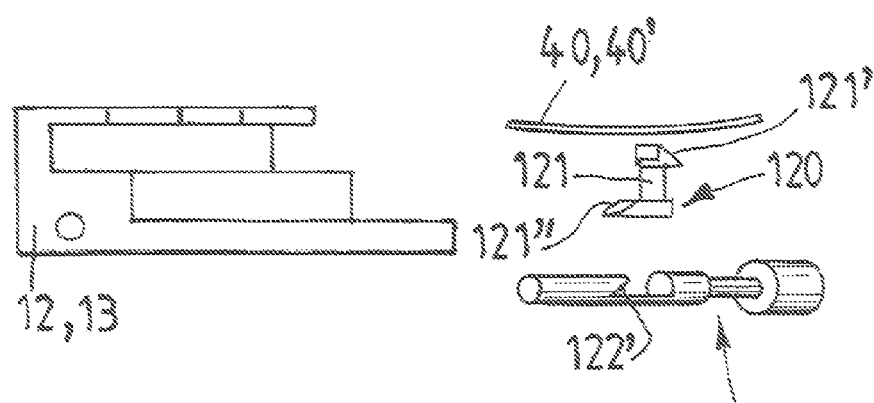
FIG. 4 is a detailed view of one end of the support shown in FIGS. 2 and 3.

As may be seen on the wall 13 in FIG. 3, an exploded view of which is shown in FIG. 4, there is a elastic means consisting of a leaf spring 40, 40' suitable for clamping the collector strip 20 against the base 11.

To hold the collector strip 20 in position in the notches 12', 13', at least one support 12, 13 includes a locking means 120.

The locking means 120 comprises at least one rod 121 suitable for cooperating with a corresponding orifice 240 of the collector strip 20.

In the example, the rod 121 is forced toward the collector strip 20 by means of a spring (not shown). An inclined part 121' of the rod 121 allows the collector strip 20 to slide over the rod 121, applying a force on the spring, until the rod 121 enters the corresponding orifice 240 of the collector strip 20.

The rod 121 is put into the position for releasing the collector strip 20 by actuating the release rod 122 which, by means of its inclined part 122' in contact with the secondary inclined part 121'', applies force to the spring (not shown) of the rod 121, thus releasing the collector strip 20. All that is then required is to rotate the collector strip 20 through a quarter of a turn in order to extract the latter from the notches 12', 13' and therefore from its support 10.

The support 10 is fastened to the rolling stock vehicle 1 by any known means, for example by bolts.

A person skilled in the art will readily understand the advantage afforded by these embodiments of a support for a collector strip, in particular saving time when changing the third-rail shoes but also providing a financial saving and an ecological advantage, especially by virtue of the fact of being able to change only the part that has worn out, namely the collector strip. The person skilled in the art will easily be able to adapt such a support for a current collector strip to other uses and especially to pantographs.

The invention claimed is:

1. A support for a current collector strip of a rolling stock vehicle, said support being suitable for holding said strip in place and for transmitting current passing through said strip to the rolling stock vehicle, said support comprising a base and at least two walls defining a space suitable for partially accommodating the strip, wherein the support comprises at least one elastic means suitable for clamping exerting a force directly on said strip to clamp said strip against said base and wherein the base has a surface for supporting the strip, said surface defining a plane, and wherein both the elastic means and the strip are disposed on a same side with respect to said plane.

2. The support as claimed in claim 1, wherein the walls and/or the at least one elastic means are made of and/or coated with an electrically insulating material.

3. The support as claimed in claim 1, wherein the base comprises at least one stud suitable for cooperating with at least one corresponding orifice of the collector strip.

4. The support as claimed in claim 1, wherein the base comprises at least one lateral stop.

5. The support as claimed in claim 1, wherein at least one wall comprises at least one notch, suitable for accommodating a suitable, or complementary, part of the collector strip.

6. The support as claimed in claim 5, wherein the at least one notch is suitable for accommodating the at least one elastic means.

7. The support as claimed in claim 6, wherein the elastic means comprises a leaf spring.

8. The support as claimed in claim 5, wherein the at least one notch is suitable for accommodating at least one locking means for locking the collector strip.

9. The support as claimed in claim 8, wherein the locking means comprises a rod suitable for penetrating a corresponding orifice of the collector strip.

10. The support as claimed in claim 1, wherein the elastic means is at least partly located at the junction between the base and the walls.

11. The support as claimed in claim 10, wherein the free ends of the walls each comprise an edge, arranged to allow moving apart the free ends of the walls.

12. A method for fastening a collector strip to a support as claimed in claim 11, comprising:
   moving apart the ends of the walls of the support, by means of the edges, sufficiently to be able to insert the collector strip thereinto;
   positioning the collector strip in the space defined between the base and the walls of the support; and releasing the ends of the walls of the support to clamp the strip against said base.

13. The method for fastening a collector strip to a support as claimed in claim 12, comprising, before the collector strip is positioned in the space, positioning an adhesive tape on that part of the strip which is in contact with the base.

14. The method for fastening a collector strip to a support as claimed in claim 12, comprising, after the ends of the walls have been released, a step of injecting an adhesive into the natural gaps or artificial gaps created between the strip and the support.

15. A method for extracting a collector strip from a support as claimed in claim 11, comprising:
- moving apart the ends of the walls of the support, by means of the edges sufficiently to be able to extract the collector strip therefrom;
- extracting the collector strip from the space defined between the base and the walls of the support; and
- releasing the ends of the walls of the support.

16. A current-collecting device comprising a support as claimed in claim 1 and a collector strip held in place in said support.

17. The current-collecting device as claimed in claim 16, wherein the collector strip comprises a carbon-based strip.

18. The current-collecting device as claimed in claim 16 comprising an adhesive means between the collector strip and the support.

19. A current-collecting shoe for a railway or pneumatic rolling stock vehicle comprising the support as claimed in claim 1.

* * * * *